3,025,288
NEW AZEPINE DERIVATIVES
Walter Schindler, Riehen, near Basel, Switzerland, assignor to Geigy Chemical Corporation, Saw Mill River Road, Ardsley, N.Y., a corporation of Delaware
No Drawing. Filed June 16, 1958, Ser. No. 742,018
Claims priority, application Switzerland June 25, 1957
6 Claims. (Cl. 260—239)

The present invention concerns new amino-acylated azepines having valuable pharmacological properties, their salts and quaternary ammonium compounds as well as processes for the production thereof.

5-dibenzo[b.f]azepine and derivatives thereof have not been known up to now. It has now been found that N-substituted dibenzo[b.f]azepines of the general formula defined below

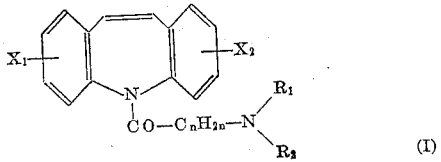
(I)

possess valuable pharmacological properties, for example strong local anaesthetic activity, whereas the corresponding quaternary ammonium salts of the general formula

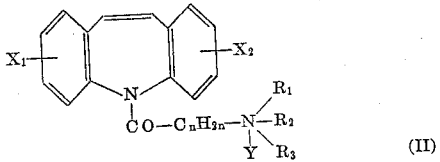
(II)

have spasmolytic properties. In the two formulae given above:

$X_1$ and $X_2$ represent hydrogen or halogen atoms,
$R_1$, $R_2$ and $R_3$ represent low molecular alkyl or alkenyl groups, or
$R_1$ and $R_2$ together with the nitrogen atom represent an alkylenimino radical having 5–6 ring members or the morpholino radical,
Y represents a monovalent anion, in particular a halogen hydracid, a low molecular alkyl sulphuric acid or an aryl sulphonic acid, and
$n$ represents a low whole number.

The new compounds of the general Formula I can be produced by reacting a possibly ring substituted N-halogen alkanoyl-dibenzo[b.f]azepine of the general formula

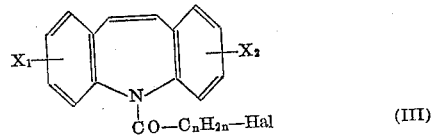
(III)

wherein Hal represents chlorine or bromine and $X_1$, $X_2$ and $n$ have the meanings given above, with an amine of the general formula:

(IV)

wherein $R_1$ and $R_2$ have the meanings given above, the reaction possibly being performed in the presence of a halogen hydracid binding agent.

The reaction can be performed in an inert solvent such as for example benzene or homologues thereof. An excess of the amine used in the reaction can serve to bind the halogen hydracid liberated in the reaction, which amine at the same time can also be the sole solvent. However, also an organic tertiary base such as dimethyl aniline or pyridine, or inorganic acid binding substances such as, for example, sodium or potassium carbonate can be used to bind the halogen hydracid.

Compounds of the general Formula I can also be produced by reacting a dibenzo[b.f]azepine of the general formula

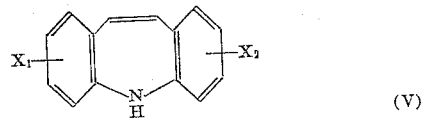
(V)

with an amino-alkanoyl chloride of the general formula

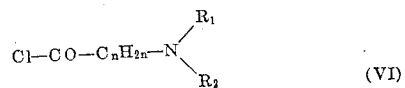
(VI)

or the hydrochloride of such an amino-alkanoyl chloride, the reaction possibly being performed in the presence of an acid binding agent. In these formulae $X_1$, $X_2$, $R_1$, $R_2$ and $n$ have the meanings given above.

In addition, compounds of the general Formula I are obtained by reacting a possibly ring substituted N-amino-alkanoyl-dibenzo[b.f]azepine of the general formula:

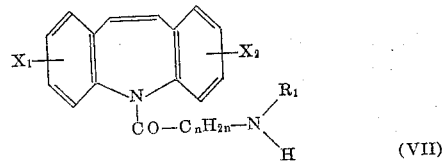
(VII)

with a reactive ester of an alcohol of the general formula

$R_2$—OH (VIII)

the reaction possibly being performed in the presence of an acid binding agent, or reacting the dibenzo[b.f]azepine compound of the general Formula VII with another alkylating agent such as for example formaldehyde or a homologue thereof in the presence of formic acid. In these formulae $X_1$, $X_2$, $R_1$, $R_2$ and $n$ have the meanings given above.

Derivatives of dibenzo[b.f]azepine and 3.7-dichloro-dibenzo[b.f]azepine substituted in 5-position by a lower α-dialkylamino-alkanoyl, α-pyrrolidino-alkanoyl or α-piperidino-alkanoyl radical, in particular a lower α-dialkylamino-, α-pyrrolidino- or α-piperidino- acetyl or -propionyl radical, are of special value because of their good local anaesthetic action and low toxicity.

The quaternary ammonium compounds of the general Formula II are obtained from tertiary amines of the general Formula I by treating these with a reactive ester of an aliphatic or araliphatic alcohol of the general formula

in particular with a halide, sulphate or aryl sulphonic acid ester and if desired, then replacing an anion arising from the acid radical of the reactive ester by another anion. However, also an N-halogen alkanoyl-dibenzo[b.f]azepine of the general Formula III can be reacted direct with a tertiary amine of the general formula:

wherein $R_1$, $R_2$ and $R_3$ have the meanings given above, to form a quaternary ammonium compound of the general Formula II.

The N-halogen alkanoyl-dibenzo[b.f]azepines necessary as starting materials are easily obtained by acylating the corresponding dibenzo[b.f]azepines with halogen fatty acid halides or also corresponding anhydrides in the presence or absence of agents which bind halogen hydracid such as for example pyridine or dimethyl aniline. The dibenzo[b.f]azepines are obtained from the corresponding iminodibenzyls by converting into N-acyl derivatives which can easily be split, halogenating for example with bromosuccinimide, splitting off hydrogen halide and hydrolysis.

Examples of N-halogen alkanoyl-dibenzo[b.f]azepines are N-chloracetyl-, N-bromacetyl-, N-(α-chloropropionyl)-, N-(α-bromopropionyl)-, N-(α-brombutyryl)-, N-(α-bromovaleryl)-, N-(α-bromo-isovaleryl)-, N-(α-bromocaproyl)-, N-(β-chloropropionyl)-, N-(β-bromopropionyl)-, N-(β-brombutyryl)-, N-(β-bromovaleryl)-, N-(γ-chlorobutyryl)-, and -N-(γ-chlorovaleryl)-dibenzo[b.f]-azepine, -3.7-dichloro-dibenzo[b.f]azepine, -2.8-dichloro-dibenzo[b.f]-azepine, and -3.7-dibromo-dibenzo[b.f]azepine.

These N-halogen alkanoyl-dibenzo[b.f]azepines can be reacted for example in the first process mentioned with dimethylamine, methylethylamine, diethylamine, dipropylamine, di-isopropylamine, dibutyl and diamyl amines, methylallylamine, diallylamine, methyl-methallylamine, bis-methallylamine, pyrrolidine, piperidine, C-alkylated pyrrolidines or piperidines or morpholine.

To produce the quaternary ammonium salts of the general Formula II direct the N-halogen alkanoyl-dibenzo[b.f]azepines given above can be reacted for example with trimethylamine or triethylamine.

Amino alkanoyl chlorides of the general Formula VI can be obtained as hydrochlorides for example by treating corresponding amino alkane carboxylic acids with phosphorus pentachloride in acetyl chloride.

The N'-mono-substituted N-(amino-alkanoyl)-dibenzo[b.f]azepines necessary in the last process for the production of the tertiary amines of the general Formula I are obtained for example by reacting the N-halogen alkanoyl-dibenzo[b.f]azepines mentioned above with primary amines or by reacting them with ammonia and then monoalkylating. The monoalkylation can be performed in the same step as the alkylation to form the end product having a tertiary amino group, for example by treating N-amino-acetyl-dibenzo[b.f]azepine with excess formaldehyde or with another alkanal in formic acid. The reactive esters of alcohols of the general Formula VIII which are also suitable for reaction are identical with the compounds of the general Formula IX listed below.

The new tertiary amines of the general Formula I form salts with inorganic and organic acids such as, for example, hydrochloric acid, sulphuric acid, phosphoric acid, acetic acid, lactic acid, succinic acid, maleic acid, tartaric acid, citric acid, salicylic acid, ascorbic acid and ethane disulphonic acid. Some of these salts dissolve in water with an almost neutral reaction.

Quaternary ammonium compounds of the general Formula II are obtained from the tertiary amines of the general Formula I by the first or second process above mentioned for example by adding methyl chloride, methyl bromide, methyl iodide, ethyl chloride, ethyl bromide, ethyl iodide, n-propyl, isopropyl, n-butyl, isobutyl, n-amyl, isoamyl and n-hexyl chlorides or bromides, dimethyl sulphate, diethyl sulphate, p-toluene sulphonic acid methyl ester, allyl bromide, allyl iodide, crotyl bromide and methallyl bromide. The halides, alkyl sulphates or aryl sulphonates obtained direct on using these starting materials can, if desired, be converted by double decomposition for example of quaternary halides with silver salts of other acids or by liberation of the quaternary bases and neutralisation with other acids, into quaternary salts with other anions.

The following example further illustrates the production of the new compounds. Where not otherwise stated, parts are given as parts by weight and their relationship to parts by volume is as that of grammes to cubic centimetres. The temperatures are in degress centigrade.

*Example*

19.3 parts of dibenzo[b.f]azepine are dissolved in 100 parts by volume of abs. benzene and 11.5 parts of chloracetyl chloride are added. The solution is boiled for 4 hours under reflux and then the solvent is completely distilled off in the vacuum. On adding ether, the residue crystallises; the N-chloracetyl-dibenzo[b.f]azepine so obtained melts at 147–148°.

12.5 parts of N-chloracetyl-dibenzo[b.f]azepine are refluxed for 24 hours with 50 parts by volume of diethylamine. The excess diethylamine is then distilled off, water is added to the residue and the mixture is thoroughly shaken out with ether. The basic portions are removed from the ethereal solution by shaking out four times with 2 N-hydrochloric acid. The acid extracts are made alkaline and again ethered out. On adding abs. alcoholic hydrochloric acid to the ethereal solution, the hydrochloride of N-(diethylaminoacetyl)-dibenzo[b.f] azepine crystallises. On recrystallising from isopropanol, it melts at 217–220°.

On adding excess methyl iodide to the free base in ethyl acetate and allowing to stand, the metho-iodide of N-diethylaminoacetyl-dibenzo[b.f]azepine crystallises out. On recrystallising from ethanol, it melts at 215–216°.

The ethereal solutions of further tertiary bases can be obtained in the manner described above. On concentration of their ethereal solutions, the free bases given below crystallise as such and can be recrystallised for example from ether or ether/pentane:

| | M.P. |
|---|---|
| N-(piperidino-acetyl)-dibenzo[b.f]azepine | 104° |
| N-(α-piperidino-propionyl)-dibenzo[b.f]azepine | 124–125° |
| N-(α-pyrrolidino-propionyl)-3.7-dichloro-dibenzo[b.f]azepine | 167–168° |
| N-(α-diethylamino-propionyl)-dibenzo[b.f]azepine | 88–89° |

On adding excess methyl iodide to the base in ethyl acetate, the metho-iodide of N-(α-diethylamino-propionyl)-dibenzo[b.f]azepine also precipitates in amorphous form. It crystallises from acetone and then melts at 212–214°.

The ethobromide and the allylobromide and N-(α-diethylamino-propionyl)-dibenzo[b.f]azepine and N-(α-diethylamino-acetyl-dibenzo[b.f]azepine are obtained in an analogous manner.

The hydrochlorides of N-(diethylamino-acetyl)-3.7-dibromo-dibenzo[b.f]azepine, N-(diallylamino-acetyl)-dibenzo-[b.f]azepine and N-(α-dipropylamino-butyryl)-dibenzo[b.f]azepine are obtained in the same way as the hydrochloride of N-(diethylamino-acetyl)-dizenzo[b.f]-azepine.

What I claim is:
1. A member selected from the group consisting of an azepine derivative of the formula:

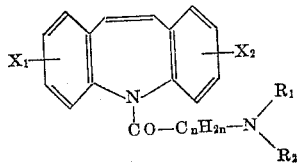

(I)

and the quaternary ammonium salt thereof of the formula:

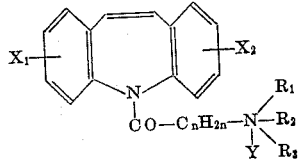

(II)

wherein each of
$X_1$ and $X_2$ represent a member selected from the group consisting of hydrogen, chlorine and bromine,
$R_1$, $R_2$ and $R_3$ when taken separately represent a member selected from the group consisting of lower alkyl and lower alkenyl groups, and $R_1$ and $R_2$ together with the nitrogen atom represent a member selected from the group consisting of alkylenimino having 5 to 6 ring members and the morpholino radical,
Y represents an anion of a halogen hydroacid, and
$n$ represents a whole number from 1 to 3 inclusive.

2. The hydrochloride of N-(diethylamino-acetyl)-dibenzo[b.f]azepine.
3. The metho-iodide of N-(diethylamino-acetyl)-dibenzo[b.f]azepine.
4. N-(piperidino-acetyl)-dibenzo[b.f]azepine.
5. N - ($\alpha$ - pyrrolidino-propionyl) - 3.7 - dichloro - dibenzo[b.f]azepine.
6. N-($\alpha$-diethylamino-propionyl-dibenzo[b.f]-azepine.

References Cited in the file of this patent

UNITED STATES PATENTS 2,809,200    Schindler et al. ---------- Oct. 8, 1957